United States Patent [19]

Asakawa et al.

[11] Patent Number: 5,408,620

[45] Date of Patent: Apr. 18, 1995

[54] CIRCUIT FOR EXECUTING CONDITIONAL BRANCH INSTRUCTIONS IN PIPELINE PROCESS

[75] Inventors: Takeo Asakawa; Aiichiro Inoue, both of Kawasaki, Japan

[73] Assignee: Fujitsu Limited, Kawasaki, Japan

[21] Appl. No.: 828,701

[22] Filed: Jan. 31, 1992

[30] Foreign Application Priority Data

Jan. 31, 1991 [JP] Japan ................. 3-031929

[51] Int. Cl.6 ............................... G06F 9/38
[52] U.S. Cl. .................. 395/375; 364/231.8; 364/948.34
[58] Field of Search ............ 395/375, 800, 775

[56] References Cited

U.S. PATENT DOCUMENTS

| | | | |
|---|---|---|---|
| 3,875,391 | 4/1975 | Shapiro | 364/DIG. 1 |
| 4,025,771 | 5/1977 | Lynch | 364/DIG. 1 |
| 4,112,489 | 9/1978 | Wood | 364/DIG. 1 |
| 4,187,539 | 2/1980 | Eaton | 364/DIG. 1 |
| 4,777,594 | 10/1988 | Jones | 364/DIG. 1 |

FOREIGN PATENT DOCUMENTS

| | | |
|---|---|---|
| 0239023 | 9/1987 | European Pat. Off. . |
| 0365188 | 4/1990 | European Pat. Off. . |
| 0400194 | 12/1990 | European Pat. Off. . |
| 52-130256 | 11/1977 | Japan . |
| 2-13333 | 4/1990 | Japan . |

OTHER PUBLICATIONS

Abstract of Japan, Application No. JP820040004, Application Date Dec. 3, 1982.

Primary Examiner—David Y. Eng
Attorney, Agent, or Firm—Staas & Halsey

[57] ABSTRACT

A circuit for executing conditional branch instructions in a pipeline process comprises registers for retaining condition codes settled set or determined at different stages, respectively, registers for retaining pipeline tags identifying instructions at the respective stages and indicating the stage where the condition codes are settled or set by the instructions, and a branch controller for deciding whether the settlement of condition codes for conditional branch instructions existing at the respective stage has occured responsive to the tags in a plurality of stages, and for selecting the settled condition codes from among the condition codes stored in the registers and indicating whether a branch should be performed.

5 Claims, 10 Drawing Sheets

Fig. 2

| | | | | | | | | | |
|---|---|---|---|---|---|---|---|---|---|
| FIRST FLOW | D | A | T | B | E | W | | | |
| SECOND FLOW | | D | A | T | B | E | W | | |
| THIRD FLOW | | | D | A | T | B | E | W | |
| FOURTH FLOW | | | | D | A | T | B | E | W |
| FIFTH FLOW | | | | | D | A | T | B | E | W |
| SIXTH FLOW | | | | | | D | A | T | B | E | W |
| SEVENTH FLOW | | | | | | | D | A | T | B | E | W |
| EIGHTH FLOW | | | | | | | | D | A | T | B | E | W |

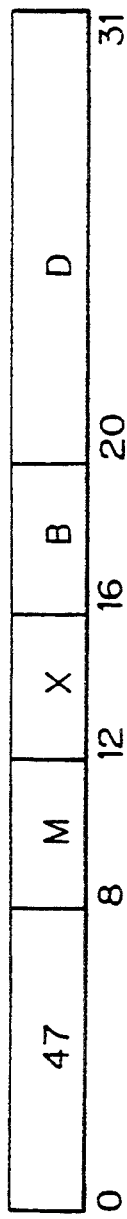
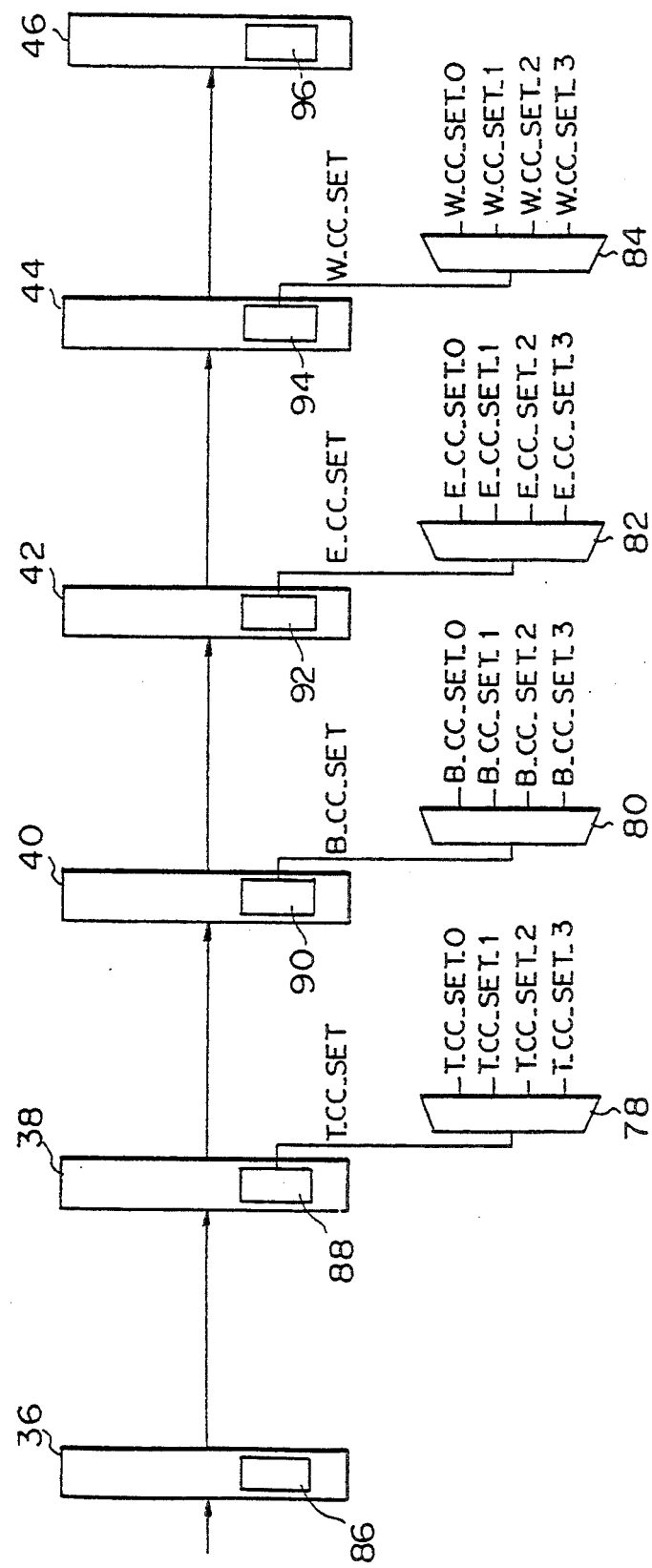
Fig. 4
Fig. 5

CIRCUIT FOR EXECUTING CONDITIONAL BRANCH INSTRUCTIONS IN PIPELINE PROCESS

BACKGROUND OF THE INVENTION

1. Field of the Invention

The present invention relates to a circuit for executing conditional branch instructions on a processor having a pipeline structure widely employed in general purpose computers, minicomputers, microcomputers, digital signal processors, and the like.

2. Description of the Related Art

Instructions executed in processors usually include conditional branch instructions and condition code setting instructions such as logical operation instructions and arithmetical operation instructions. When the condition code setting instruction has been executed, a value of a condition code, which indicates a state of the operation result, such as zero, plus, or minus, is settled, and when the conditional branch instruction is executed, the condition code is examined to determine whether the condition code satisfies a branch condition specified by the instruction, and flow of execution branches to an address specified by the instruction if the branch condition is satisfactory.

In a processor having a pipeline structure constituted by multiple stages, instructions have to be successively fed into a first stage of the pipeline in accordance with order of execution. Nevertheless, after a conditional branch instruction is fed into the first stage, the instruction to be fed next is sometimes not definite because the condition codes for the conditional branch instruction are sometimes not definite at that time because they are settled, or, the conditions for the branch are determined in a latter stage of the pipeline.

Therefore, in a pipeline process, it is important to decide earlier whether or not the branch condition is satisfactory in order to improve the execution rate for instructions including conditional branch instructions.

Japanese Unexamined Patent Publication (Kokai) No. 52-130256 discloses an information processing apparatus comprising a circuit for executing conditional branch instructions in a pipeline process. In this circuit, while a conditional branch instruction flows through the pipeline, it is determined whether a condition code setting instruction not yet settled with a condition code exists at stages later than that of the conditional branch instruction. If such instruction exists, examination of the branch condition for the conditional branch instruction flowing through the pipeline is delayed until all of the condition code setting instructions at latter stages settle the condition codes. After that, if the branch condition is satisfactory, instructions existing at stages earlier than that of the conditional branch instruction are canceled with intermediate results thereof, and an instruction stream at an address specified by the conditional branch instruction is fed into the pipeline. If the branch condition is not satisfactory, feeding of the instruction stream is continued.

In the circuit disclosed in the above publication, determination whether an executed condition code setting instruction exists in latter stages is effected as if all of condition code setting instructions settle the condition codes at the same stage. In fact, some of the instructions such as instructions performing operations between register operands settle the condition codes at a stage earlier than others, but the circuit disclosed in the above publication cannot recognize the earlier settlement of the condition codes.

Japanese Examined Patent Publication (Kokoku) No. 2-13333 discloses an information processing apparatus comprising a circuit for executing conditional branch instructions in a pipeline process, wherein the circuit can recognize earlier settlement of the condition codes. In this circuit, condition code setting instructions fed into the pipeline are separately counted corresponding to respective stages where the instructions settle the condition codes. When condition code setting instructions settle the condition codes at respective stages, the corresponding counts are decremented. When a conditional branch instruction is fed into the first stage, examination of the branch condition is carried out to determine if all of the counts are equal to zero, which indicates that a condition code for the fed conditional branch instruction has been settled. Then, if the settled condition code does not satisfy the branch condition in the examination, an instruction stream at an address next to the address of the conditional branch instruction is fed into the pipeline. If the branch condition is satisfied, an instruction stream at an address specified by the conditional branch instruction is fed.

In the circuit disclosed in the second publication, the earlier settlement of the condition codes can be recognized, but if any of the counts are not equal to zero when a conditional branch instruction is fed into the pipeline, feeding of the instruction stream is interrupted until all of the counts become equal to zero, because the counts are disturbed if any condition code setting instruction is further fed before the condition code for the conditional branch instruction is settled. Therefore, even in the case where the branch condition may not be satisfied, feeding of further instructions is interrupted, and thus, the execution rate is reduced in situations where branch conditions are not satisfied when executing the conditional branch instructions.

SUMMARY OF THE INVENTION

It is an object of the present invention to provide a circuit for executing conditional branch instructions in a pipeline process wherein an instruction stream following a conditional branch instruction can be continuously fed into the pipeline independent of settlement of condition codes, and wherein an earlier decision of a branch condition can be attained corresponding to positions of condition code setting stages.

In accordance with the present invention, there is provided a circuit for executing conditional branch instructions in a pipeline process constituted by a plurality of stages, wherein condition codes referred to in order to execute the conditional branch instructions are settled by condition code setting instructions at different stages of the pipeline process. The circuit includes a plurality of first storage means, connected to the respective stages where the condition codes are settled, for storing condition codes settled at the respective stages, respectively, a plurality and of second storage means, provided in a plurality of stages of the pipeline process, respectively, for storing tags identifying instructions at the respective stages and indicating the stage where the condition code is settled if the instruction existing at the stage is the condition code setting instruction. The circuit also includes control means, connected to the first storage means, and the second storage means, for detecting settlement of the condition codes for the conditional branch instructions existing at the respective stages, and for selecting the settled condition codes from among the condition codes stored in the first storage means, in accordance with the tags stored in the second storage means.

BRIEF DESCRIPTION OF THE DRAWINGS

FIG. 2 is a diagram showing an example of instruction flows in the pipeline process shown in FIG. 1;

FIG. 4 is a diagram showing the construction of a conditional branch instruction;

FIG. 5 is a diagram showing registers for retaining pipeline tags;

DESCRIPTION OF THE PREFERRED EMBODIMENTS

Figure 1:
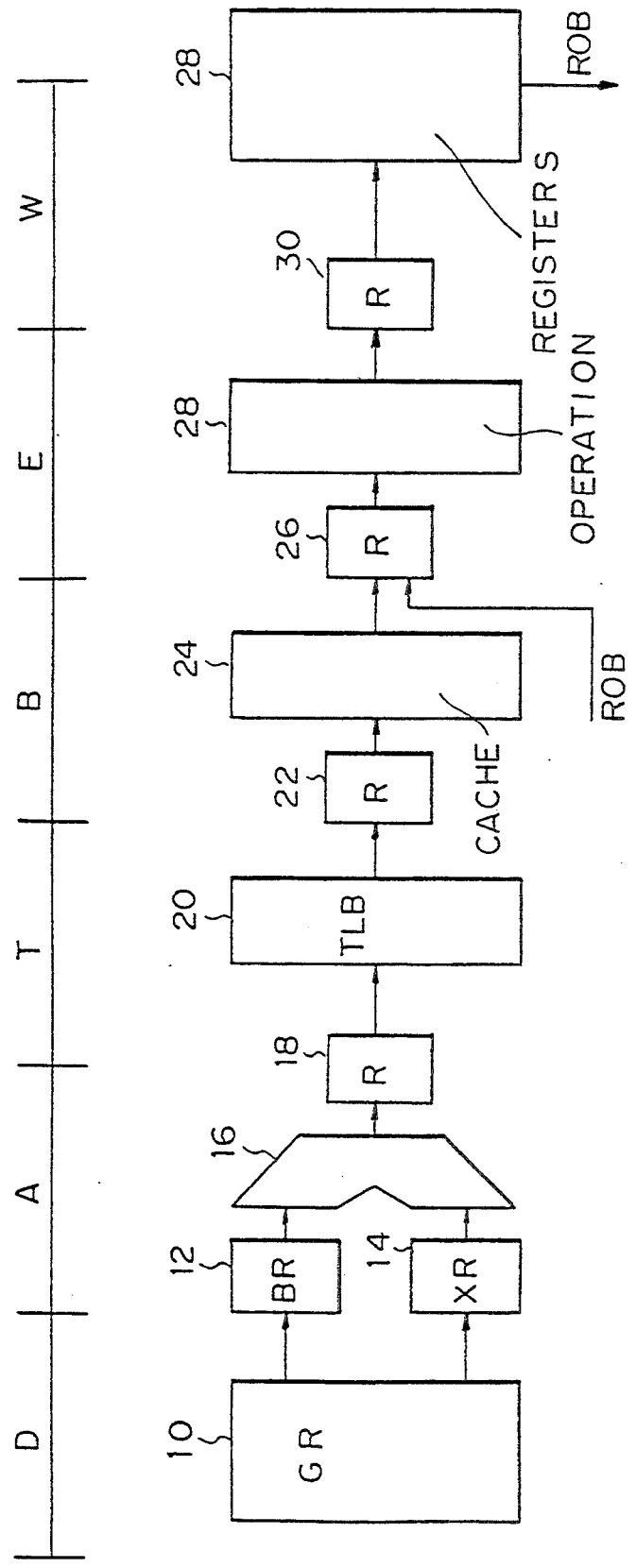
FIG. 1 is a block diagram showing an example of pipeline processes to which the present invention is applied.

FIG. 1 shows an example of pipeline processes to which the present invention is applied.

The pipeline process is constituted by a D (Decode) stage for instruction decoding and for reading-out the contents of general registers, an A (Address) stage for calculating a logical address from the contents of general registers, a T (Translation) stage for translating the logical address into a real address, a B (Buffer) stage for reading-out a memory operand, an E (Execution) stage for executing operations, and a W (Write) stage for writing execution results in registers.

At the D stage, an instruction fed into the pipeline is decoded into control signals which flow through the pipeline in parallel (not shown in FIG. 1) as a pipeline tag specifying the instruction, and if specified in the instruction content of one or two general registers are read out from a GR (General purpose Register) stack 10 and are stored into a BR (Base Register) 12 and an XR (index Register) 14.

At the A stage, the contents of the index register 14 are added to the contents of the base register 12 in an adder 16 according to the pipeline tag and the results are stored into a register 18. If the instruction is for executing an operation between two register operands, for example, if the instruction is an AR (Add Register) instruction for adding the contents of a specified GR to the contents of another specified GR, a condition code is settled, set or determined, at the end of the A stage, i.e., at the T stage.

At the T stage, the logical address stored in the register 18 is translated into the real address in a TLB (Translation Lookup Buffer) 20 and is stored into a register 22 if a memory operand is specified in the instruction. The TLB 20 preferably consists of a random access memory (RAM).

At the B stage, the contents of a cache memory 24 are read out as a memory operand according to the real address stored in the register 22 and the memory operand is stored into the register 26 with a register operand supplied through an ROB (Register Operand Bus) from all sorts of registers 28 including the GR stack 10.

At the E stage, various operations such as an arithmetical operation are executed in an operation unit 28 and the results of the operations are stored in a result word register 30. If the instruction is for executing a simple operation on a smaller number of bits, for example, if the instruction is a CLI (Compare Logical Immediate) instruction for deciding whether or not smaller bits of a register operand are equal to an immediate data included in the instruction, the condition code is settled at an earlier step of thee stage. If the instruction requires full-bit operation, for example, if the instruction is A (Add) instruction for adding full-bit of the memory operand to full-bit of the register operand, the condition code is settled at the end of E stage, i.e., at the W stage.

At the W stage, the contents of the result word register 30 is written in one of all sorts of registers 28.

FIG. 2 shows instruction flows in the pipeline process shown in FIG. 1. In FIG. 2, for example, when the second flow is fed into the D stage, the first flow is flowing through the A stage. Similarly, when the fifth flow is fed into the D stage, the first flow is flowing through the E stage, the second flow is flowing through B stage, the third flow is flowing through the T stage, and fourth flow is flowing through the A stage.

Figure 3:
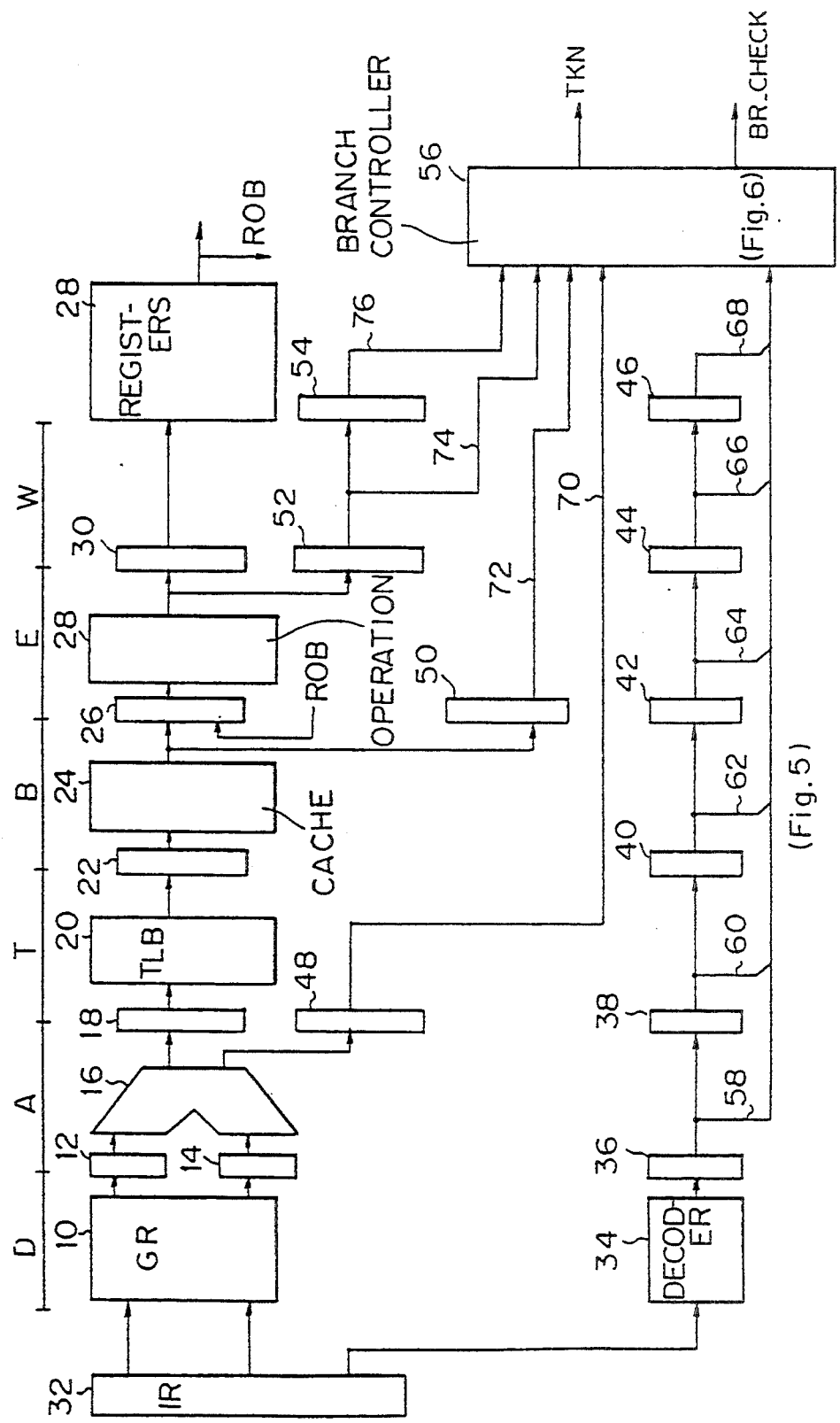
FIG. 3 is a block diagram showing a construction of a circuit for executing conditional branch instructions according to an embodiment of the present invention.

FIG. 3 shows the construction of a circuit for executing conditional branch instructions according to an embodiment of the present invention.

The data flow from GR 10 to the registers 28 has been explained with reference to FIG. 1. An instruction code included in an instruction set stored in an instruction register 32 is decoded in a decoder 34 into a pipeline tag, which flows parallel to the data flow in registers 36 to 46. If a condition code is settled in the T stage, the settled condition code is stored in a register 48. When a simple instruction, such as CLI instruction, is executed in the E stage, the register operand is stored with the immediate operand in a register 50. If a condition code is settled at the W stage, the settled condition code is stored in a register 52 and is copied to a register 54 in the next execution cycle.

A branch controller 56 recognizes whether or not instructions existing at the respective stages are conditional branch instructions and recognizes the branch conditions specified by the existing conditional branch instructions, according to the pipeline tags supplied through lines 58 to 68. The branch controller 56 also recognizes stages where the condition codes are settled by condition code setting instructions existing at the respective stages, according to the pipeline tags supplied through the lines 58 to 68.

Also, the branch controller 56 recognizes values of condition codes settled at the respective stages through lines 70 to 76. Based on the above information, determination whether the condition codes for the existing conditional branch instruction has been settled, and whether the branch condition is satisfactory, are effected in the branch controller 56.

FIG. 4 shows the construction of a BC (Branch Conditional) instruction as an example of the conditional branch instructions.

In FIG. 4, the bits 0 to 7 constitute an instruction code 47H to specify the instruction. The bits 8 to 11 constitute a mask field to provide four mask bits to specify the branch condition. The four mask bits correspond to four states which the condition code represents, respectively. If a mask bit is logic "0", a state corresponding to the mask bit is masked, and if the mask bit is logic "1", the state corresponding to the mask bit, i.e., unmasked state is examined. If the unmasked state is true, it is determined that the branch condition is satisfactory.

The bits 12 to 15 specify the index register, the bits 16 to 19 specify the base register, and the bits 20 to 31 constitute the value of a displacement. At the A stage, the contents of the index register and the value of the displacement are added to the contents of the base register, and at the T stage, the results as the logical address are translated into the real address to provide the branch address.

The four mask bits and a signal decoded from the instruction code 47H flow through the registers 36 to 46 in forms of a BRANCH MASK signal and a CONDITION BRANCH signal, respectively, which are described in detail later.

FIG. 5 shows the registers 36 to 46 for retaining the pipeline tags indicating the instructions existing at the respective stages. The pipeline tag includes a two-bit signal CC_SET stored in registers 86 to 96. The signal CC_SET indicates the stage where the corresponding instruction settles or determines the values of CC-Set the condition codes. The signals are decoded in decoders 78 to 84 into four signals CC_SET_0, 1, 2 and 3 in the stages T to W, respectively. The signal (T_, B_, E_, or W_) CC_SET_0 indicates that an instruction that does not change the condition codes exists at that stage, the signal (T_, B_, E_, or W_) CC_SET_1 indicates that an instruction that settles the condition codes at T stage exists at that stage, the signal CC_SET_2 indicates that an instruction that changes the condition codes at earlier step of E stage exists at that stage, and the signal CC_SET_2 indicates that an instruction that settles the condition codes at W stage exists at that stage.

Figure 6:
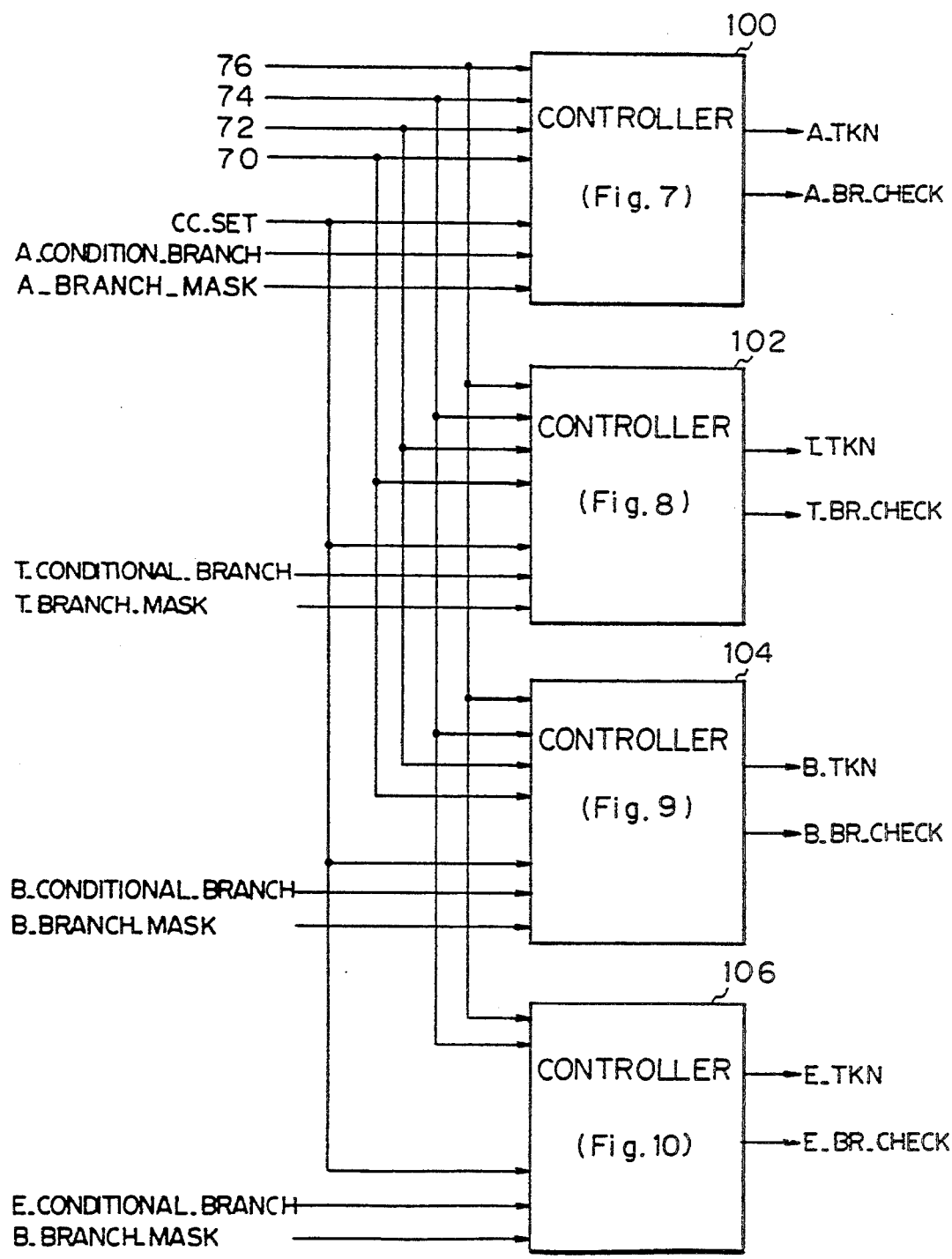
FIG. 6 is a block diagram showing a more detailed construction of a branch controller 56 of FIG. 3.

FIG. 6 shows a more detailed construction of the branch controller 56 of FIG. 3. The branch controller 56 comprises controllers 100 to 106 for processing conditional branch instructions existing at the A, T, B, and E stages, respectively.

Figure 7:
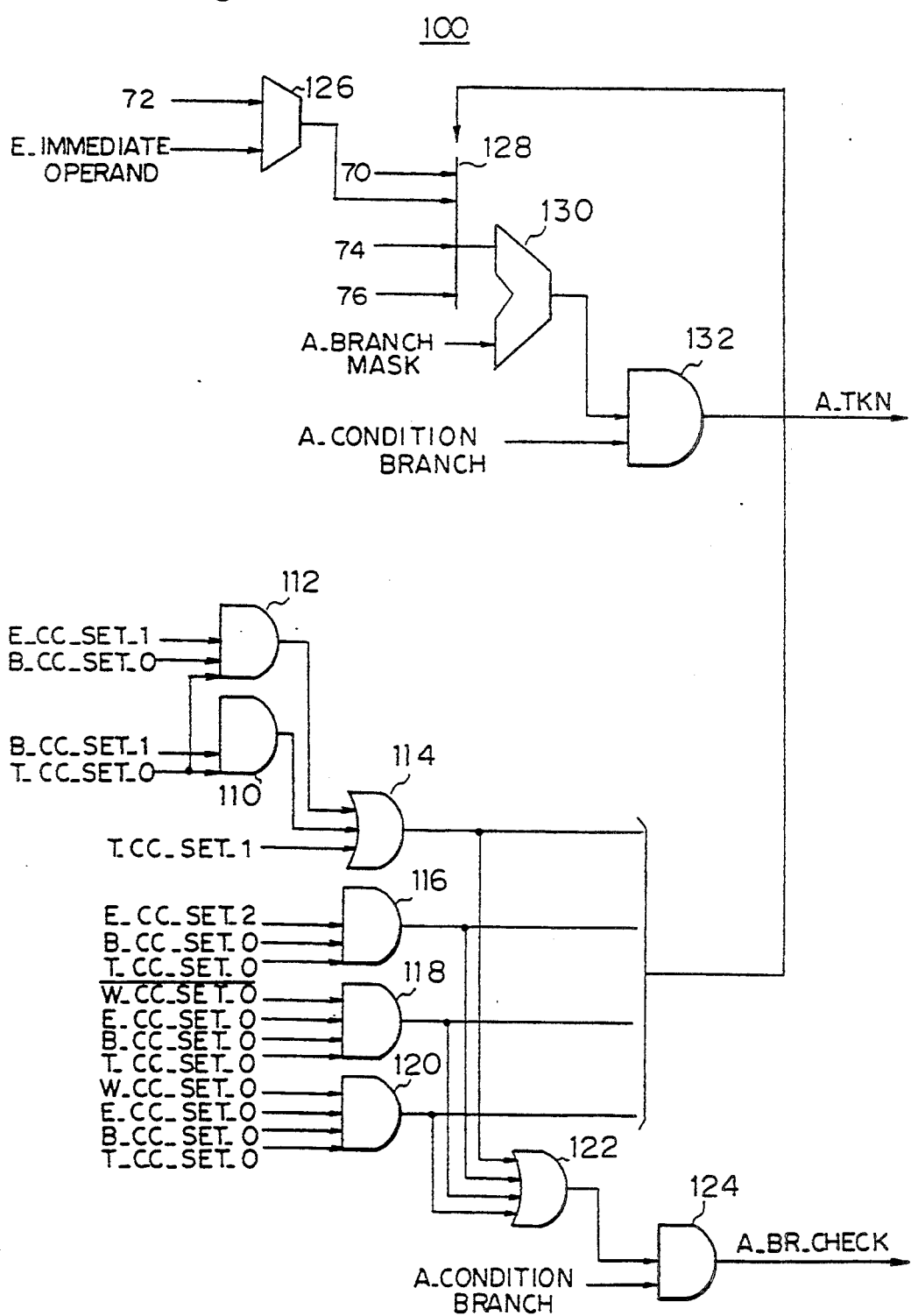
FIG. 7 is a circuit diagram of a controller 100 of FIG. 6.

FIG. 7 is a circuit diagram of the controller 100 for A stage. Referring to FIG. 3, when a conditional branch instruction exists at the A stage, a condition code to be used by that conditional branch instruction is settled at the register 48 of the T stage in three cases. The first case is where an instruction settling the condition code at the T stage (CC_SET_1 is true) exists at the T stage, i.e., the signal T_CC_SET_1 is true. The second case is where an instruction not changing the condition code (CC_SET_0 is true) exists at the T stage and an instruction settling the condition code at the T stage exists at the B stage, i.e., T_CC_SET_0 and B_CC_SET_1 are true. The third case is where instructions not changing the condition code exist at the T stage and the B stage and an instruction settling the condition code at the T stage exists at E stage, i.e., T_CC_SET_0, B_CC_SET_0, and E_CC_SET_1 are true. In FIG. 6, two signals T_CC_SET_0 and B_CC_SET_1 are input to an AND gate 110. Therefore, an output signal of the AND gate 110 indicates that the second case has occurred. Since three signals T_CC_SET_0, B_CC_SET_0, and E_CC_SET_1 are input to an AND gate 112, an output signal of the AND gate 112 indicates that the third case has occurred. Since the signal T_CC_SET_1, the output signal of the AND gate 110 and the output signal of the AND gate 112 are input to an OR gate 114, an output signal of the OR gate 114 indicates that the condition code to be used by the conditional branch instruction at the A stage is settled in the register 48 of the T stage.

Similarly, the condition code to be used by the conditional branch instruction existing at the A stage is settled at an earlier step of the E stage, in the case where instructions not changing the condition code exist at the T stage and the B stage, i.e., T_CC_SET_0 and B_CC_SET_0 are true, and an instruction settling the condition code at an earlier step of the E stage exists at the E stage, i.e., E_CC_SET_2 is true. An output signal of an AND gate 116, to which the signals T_CC_SET_0, B_CC_SET_0, and E_CC_SET_2 are input, indicates that case.

Similarly, the condition code to be used by the conditional branch instruction existing at A stage is settled at the W stage, if instructions not changing the condition code exist at the T, B, and E stages, i.e., T_CC_SET_0, B_CC_SET_0, and E_CC_SET_ are true, and a condition code settled at some stage has been stored in the register 52 at the W stage, i.e. $\overline{W\_CC\_SET\_O}$ is true. An output signal of an AND gate 118, where the signals T_CC_SET_0, B_CC_SET_0, E_CC_SET_0, and $\overline{W\_CC\_SET\_O}$ are input, indicates that case.

In addition, if instructions not changing the condition code exist at the T, B, E, and W stages, i.e., if T_CC_SET_0, B_CC_SET_0, E_CC_SET_0, and W_CC_SET_0 are true, the condition code for the conditional branch instruction existing at the A stage is stored in register 54, because an instruction which has settled that condition code has escaped from the pipeline. An output signal of an AND gate 120, where the signals T_CC_SET_0, B_CC_SET_0, E_CC_SET_0, and W_CC_SET_0 are input, indicates that case.

Since the output signals of the OR gate 114 and the AND gates 116 to 120 are input to an OR gate 122, and the output signal of the OR gate 122 and a signal A_CONDITION_BRANCH indicating that a conditional branch instruction exists at the A stage are input to an AND gate 124, an output signal of the AND gate 124 (A_BR_CHECK) indicates that a conditional branch instruction exists at the A stage and a condition code for the instruction is settled. The signal A_BR_CHECK is supplied to a circuit for managing the state of a pipeline (not shown).

The register operand stored in the register 50 (FIG. 3) is supplied through the line 72 to one input of a calculator 126, and an immediate operand is supplied to another input of the calculator 126. The calculator 126 calculates the condition code parallel with the operation unit 28 (FIG. 3) and outputs the condition code, which is supplied to one input of a selector 128. The condition codes stored in the registers 48, 52, and 54 are supplied through lines 70, 74, and 76 to the other inputs of the selector 128. The selector 128 selects the condition code supplied through line 70 if the output signal of the OR gate 114 is active, selects the condition code supplied from the calculator 126 if the output signal of the AND gate 116 is active, selects the condition code supplied through the line 74 if the output signal of the AND gate 118 is active, and selects the condition code supplied through the line 76 if the output signal of the AND gate 120 is active. In the selector 128, the input signal depicted in a higher position in FIG. 7 has higher priority.

The condition code selected in the selector 128 is examined with reference to a signal A_BRANCH_MASK indicating a branch condition specified by instruction at the A stage, in a comparator 130. In the comparater 130, two bits of the condition code are decoded into four signals, and a mask operation with the signal A_BRANCH_MASK is applied to the individual signals. If an unmasked signal is true, an output signal of the comparater 130 becomes active. The output signal of the comparater 130 is input to one of inputs of an AND gate 132. The signal A_CONDITION_BRANCH is input to the other input of the AND gate 132. Therefore, the output signal A_TKN indicates that the branch condition specified by a conditional branch instruction at the A stage has been satisfied.

Figure 8:
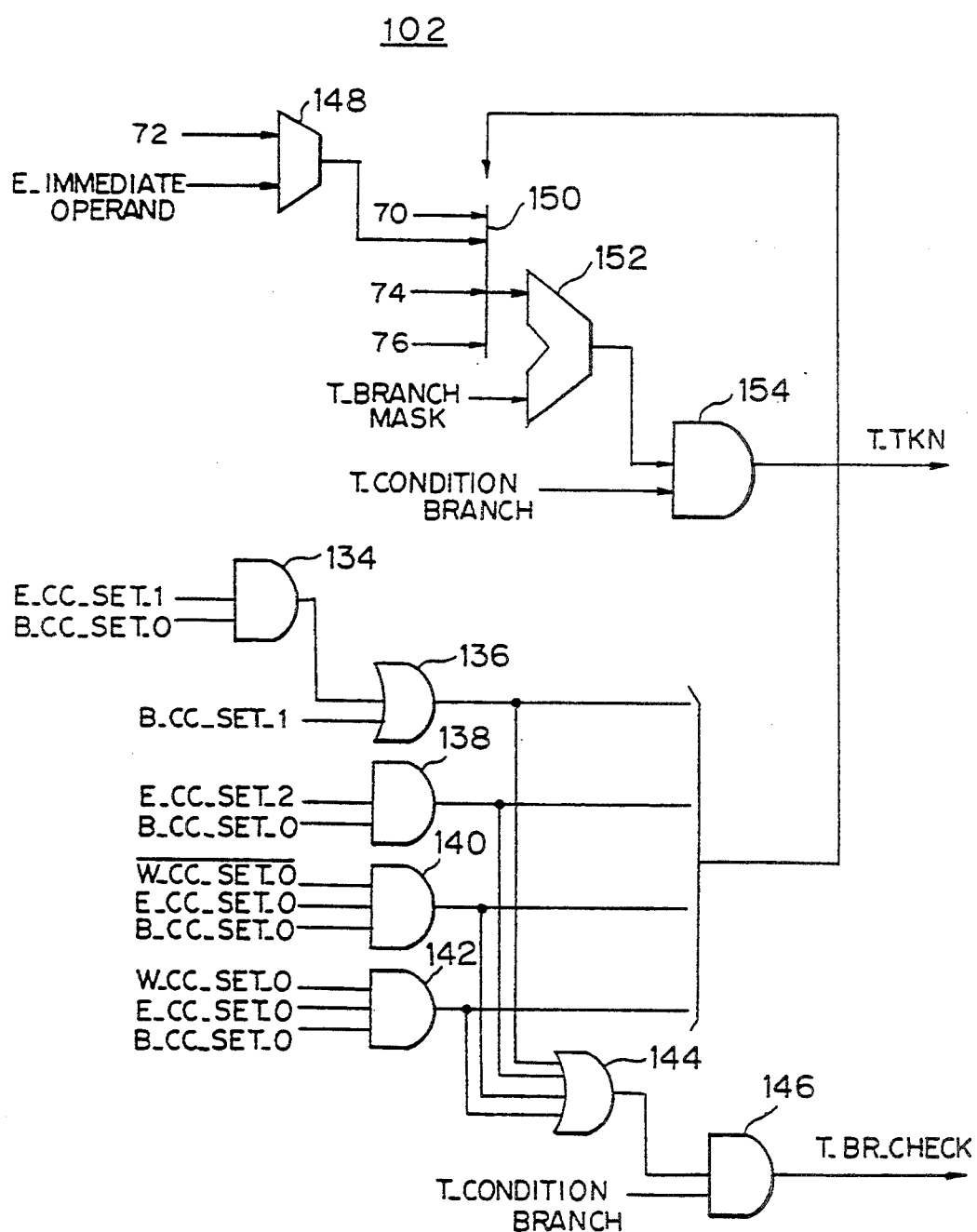
FIG. 8 is a circuit diagram of a controller 102 of FIG. 6.

FIG. 8 is a circuit diagram of the controller 102 for the T stage. Referring to FIG. 3, when a conditional branch instruction exists at the T stage, a condition code to be used by that conditional branch instruction is settled at the register 48 of T stage in two cases. The first case is where an instruction settling the condition code at the T stage (CC_SET_1 is true) exists at B stage, i.e., the signal B_CC_SET_1 is true. The second case is where an instruction not changing the condition code (CC_SET_0 is true) exists at the B stage and an instruction settling the condition code at the E stage exists at the B stage, i.e., B_CC_SET_0 and E_CC_SET_1 are true. In FIG. 8, two signals B_CC_SET_0 and E_CC_SET_1 are input to an AND gate 134. Therefore, an output signal of the AND gate 134 indicates that the second case has occurred. Since the signal B_CC_SET_1, and the output signal of the AND gate 134 are input to an OR gate 136, an output signal of the OR gate 136 indicates that the condition code to be used by the conditional branch instruction at the T stage is settled in the register 48 of T stage.

Similarly, the condition code to be used by the conditional branch instruction existing at the T stage is settled at an earlier step of the E stage, in the case where instructions not changing the condition code exist at the B stage, i.e., B_CC_SET_0 is true, and an instruction settling the condition code at an earlier step of the E stage exists at the E stage, i.e., E_CC_SET_2 is true. An output signal of an AND gate 138, to which the signals B_CC_SET_0 and E_CC_SET_2 are input, indicates that case.

Similarly, the condition code to be used by the conditional branch instruction existing at the T stage is settled at the W stage, if instruction not changing the condition code exist at the B and E stages, i.e., B_CC_SET_0 and E_CC_SET_0 are true, and a condition code settled at some stage has been stored in the register 52 at the W stage, i.e., W_CC_SET_0 is true. An output signal of an AND gate 140, where the signals B_CC_SET_0, E_CC_SET_0, and W_CC_SET_0 are input, indicates that case.

In addition, if instructions not changing the condition code exist at the B, E, and W stages, i.e., if B_CC_SET_0, E_CC_SET_0, and W_CC_SET_0 are true, the condition code for the conditional branch instruction existing at the T stage is stored in register 54, because an instruction which has settled that condition code has escaped from the pipeline. An output signal of an AND gate 142, where signals B_CC_SET_0, E_CC_SET_0, and W_CC_SET_0 are input, indicates that case.

Since the output signals of the OR gate 136 and the AND gates 138 to 142 are input to an OR gate 144, and the output signal of the OR gate 144 and a signal T_CONDITION_BRANCH indicating that a conditional branch instruction exists at the T stage are input to an AND gate 146, an output signal of the AND gate 146 (T_BR_CHECK) indicates that a conditional branch instruction exists at the T stage and a condition code for the instruction is settled. The signal T_BR_CHECK is supplied to a circuit for managing the state of a pipeline (not shown).

The register operand stored in the register 50 (FIG. 3) is supplied through the line 72 to one input of a calculator 148, and an immediate operand is supplied to another input of the calculator 148. The calculator 148 calculates the condition code parallel with the operation unit 28 (FIG. 3) and outputs the condition code, which is supplied to one input of a selector 150. The condition codes stored in the registers 48, 52, and 54 are supplied through lines 70, 74, and 76 to the other inputs of the selector 150. The selector 150 selects the condition code supplied through line 70 if the output signal of the OR gate 136 is active, selects the condition code supplied from the calculator 148 if the output signal of the AND gate 138 is active, selects the condition code supplied through the line 74 if the output signal of the AND gate 140 is active, and selects the condition code supplied through the line 76 if the output signal of the AND gate 142 is active. In the selector 150, the input signal depicted in a higher position in FIG. 8 has higher priority.

The condition code selected in the selector 150 is examined with reference to a signal T_BRANCH_MASK indicating a branch condition specified by instruction at the T stage, in a comparator 152. In the comparator 152, two bits of the condition code are decoded into four signals, and a mask operation with the signal T_BRANCH_MASK is applied to the individual signals. If an unmasked signal is true, an output signal of the comparator 152 becomes active. The output signal of the comparator 152 is input to one of inputs of an AND gate 154. The signal T_CONDITION_BRANCH is input to the other input of the AND gate 154. Therefore, the output signal T_TKN indicates that the branch condition specified by a conditional branch instruction at the T stage has been satisfied.

Figure 9:
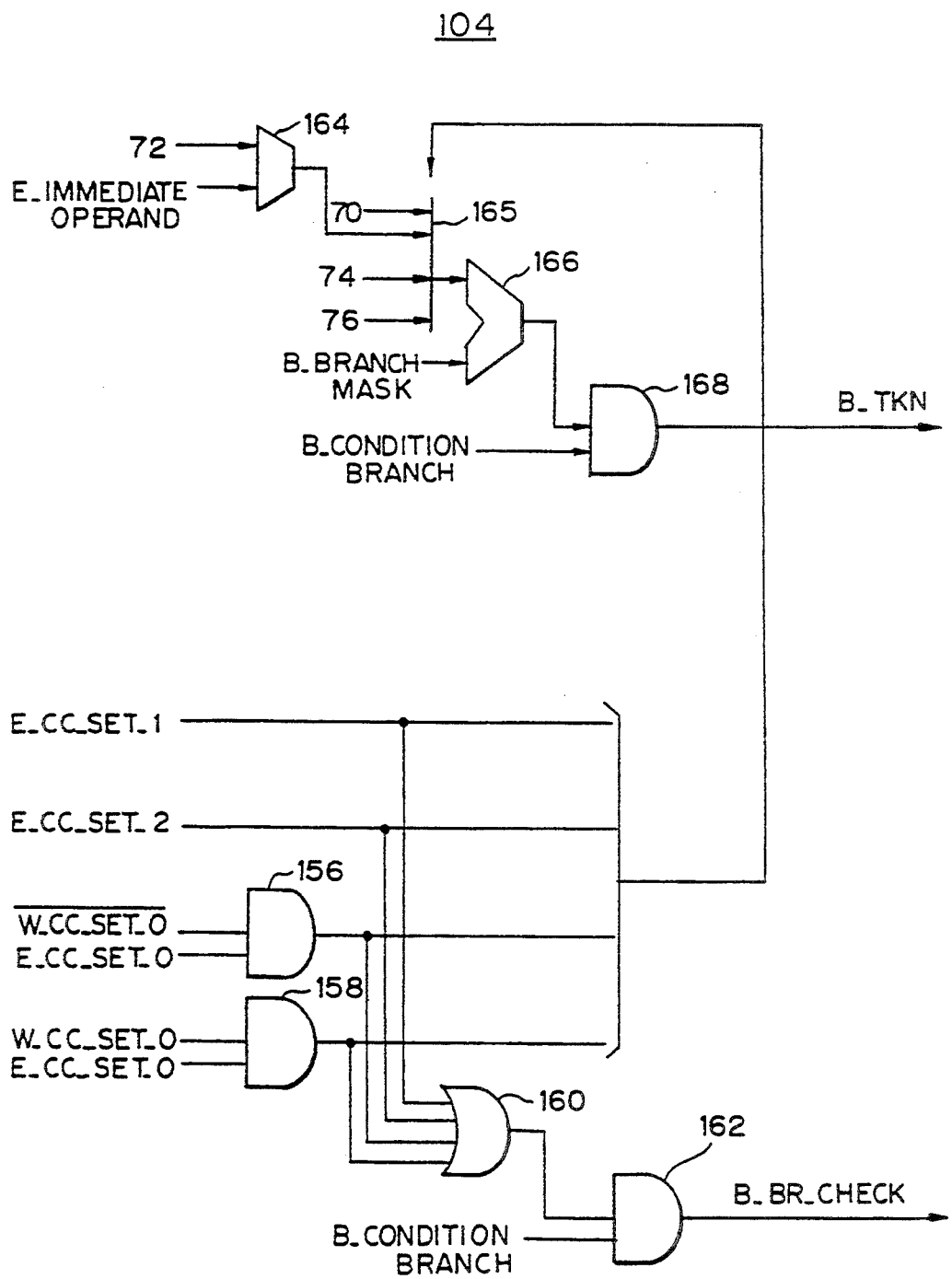
FIG. 9 is a circuit diagram of a controller 104 of FIG. 6.

FIG. 9 is a circuit diagram of the controller 104 for the B stage. Referring to FIG. 3, when a conditional branch instruction exists at the B stage, a condition code to be used by that conditional branch instruction is settled at the register 48 of the T stage in the case where an instruction settling the condition code at the T stage exists at the E stage, i.e., E_CC_SET_1 is true. The condition code to be used by the conditional branch instruction existing at the B stage is settled at an earlier step of the E stage, in the case where an instruction settling the condition code at an earlier step of the E stage exists at the E stage, i.e., E_CC_SET_2 is true.

The condition code to be used by the conditional branch instruction existing at the B stage is settled at the W stage, if an instruction not changing the condition code existing at the E stage, i.e., E_CC_SET_0 is true, and a condition code settled at some stage has beech stored in the register 52 at the W state, i.e., $\overline{W\_C}$ C_SET_0 is true. An output signal of an AND gate 156, where the signals E_CC_SET_0 and W_CC_SET_0 are input, indicates that case.

If instructions not changing the condition code exist at the E and W stages, i.e., if E_CC_SET_0 and W_CC_SET_0 are true, the condition code for the conditional branch instruction existing at the B stage is stored in register 54, because an instruction which has settled that condition code has escaped from the pipeline. An output signal of an AND gate 158, where signals E_CC_SET_0 and W_CC_SET_0 are input, indicates that case.

Since the signals E_CC_SET_1 and E_CC_SET_2 and the output signal of the AND gates 156 and 158 are input to an OR gate 160, and the output signal of the OR gate 160 and a signal B_CONDITION_BRANCH indicating that a conditional branch instruction exists at the B stage are input to an AND gate 162, an output signal of the AND gate 162 (B_BR_CHECK) indicates that a conditional branch instruction exists at the B stage and a condition code for the instruction is settled. The signal B_BR_CHECK is supplied to a circuit for managing the state of a pipeline (not shown).

The register operand stored in the register 50 (FIG. 3) is supplied through the line 72 to one input of a calculator 164, and an immediate operand is supplied to another input of the calculator 164. The calculator 164 calculates the condition code parallel with the operation unit 28 (FIG. 3) and outputs the condition code, which is supplied to one input of a selector 165. The condition codes stored in the registers 48, 52, and 54 are supplied through lines 70, 74, and 76 to the other inputs of the selector 165. The selector 165 selects the condition code supplied through line 70 if the signal E_CC_SET_1 is active, selects the condition code supplied from the calculator 164 if the signal E_CC_SET_2 is active, selects the condition code supplied through the line 74 if the output signal of the AND gate 156 is active, and selects the condition code supplied through the line 76 if the output signal of the AND gate 158 is active. In the selector 165, the input signal depicted in a higher position in FIG. 9 has higher priority.

The condition code selected in the selector 165 is examined with reference to a signal B_BRANCH_MASK indicating a branch condition specified by instruction at B stage, in a comparator 166. In the comparator 166, two bits of the condition code are decoded into four signals, and a mask operation with the signal B_BRANCH_MASK is applied to the individual signals. If an unmasked signal is true, an output signal of the comparator 166 becomes active. The output signal of the comparator 166 is input to one of inputs of an AND gate 168. The signal B_CONDITION_BRANCH is input to the other input of the AND gate 168. Therefore, the output signal B_TKN indicates that the branch condition specified by a conditional branch instruction at the B stage has been satisfied.

Figure 10:
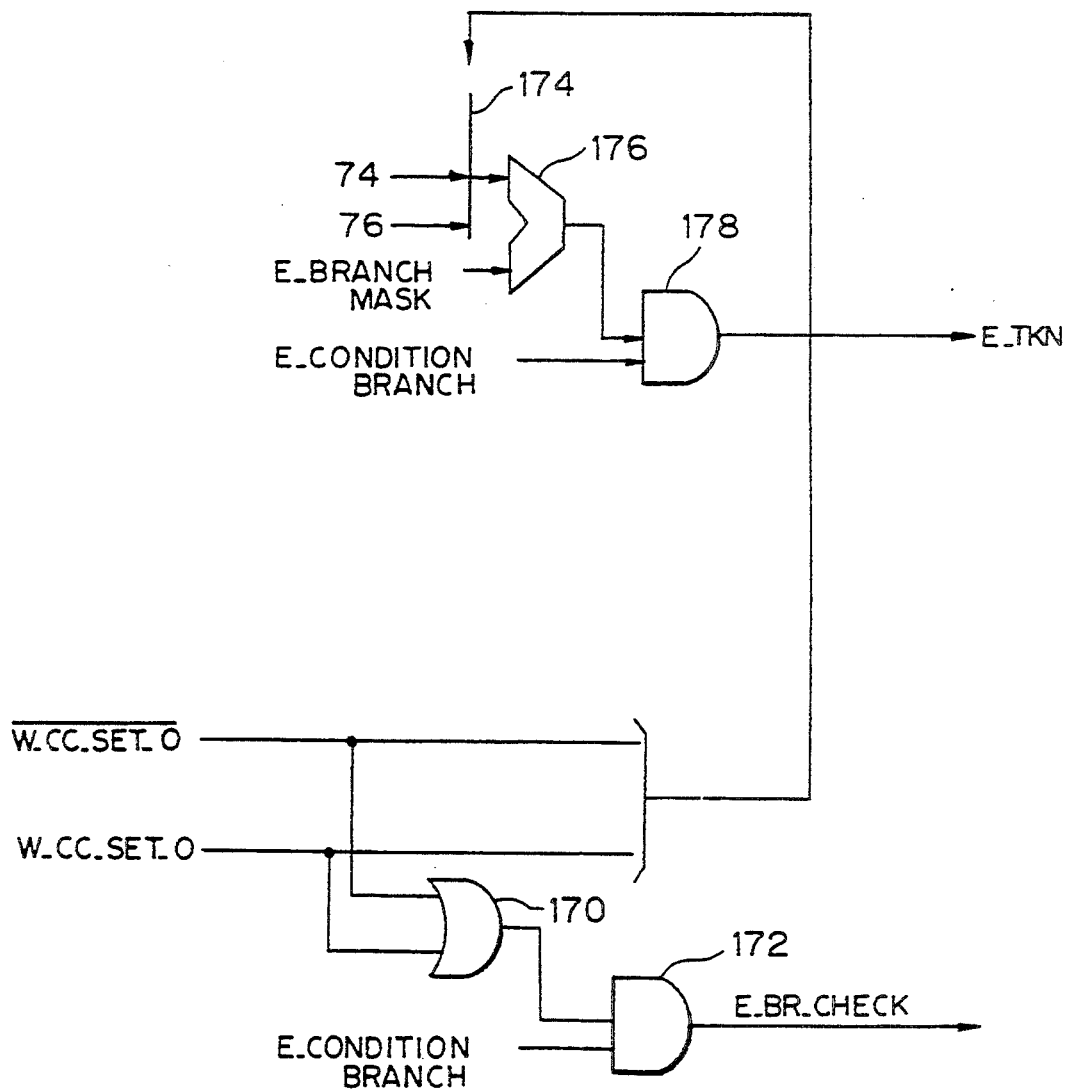
FIG. 10 is a circuit diagram of a controller 106 of FIG. 6.

FIG. 10 is a circuit diagram of the controller 106 for the E stage. Referring to FIG. 3, the condition code to be used by the conditional branch instruction existing at the E stage is settled at W stage, if a condition code settled at some stage has been stored in the register 52 at the W state, i.e., W_CC_SET_0 true.

If instructions not changing the condition code exist at the W stage, i.e., if W_CC_SET_0 are true, the condition code for the conditional branch instruction existing at the E stage is stored in register 54, because an instruction which has settled that condition code has escaped from the pipeline.

Since the signals W_CC_SET_0 and W_CC_SET_0 are input to an OR gate 170, and the output signal of the OR gate 170 and a signal E_CONDITION_BRANCH indicating that a conditional branch instruction exists at the E stage are input to an AND gate 172, an output signal of the AND gate 172 (E_BR_CHECK) indicates that a conditional branch instruction exists at the E stage and a condition code for the instruction is settled. The signal E_BR_CHECK is supplied to a circuit for managing the state of a pipeline (not shown).

The condition codes stored in the registers 52 and 54 are supplied through lines 74 and 76 to inputs of the selector 174. The selector 174 selects the condition code supplied through the line 74 if the signal W_CC_SET_0 is active, and selects the condition code supplied through the line 76 if the signal W_CC_SET_0 is active. In the selector 174, the input signal depicted in a higher position in FIG. 10 has higher priority.

The condition code selected in the selector 174 is examined with reference to a signal E_BRANCH_MASK indicating a branch condition specified by instruction at the E stage, in a comparator 176. In the comparator 176, two bits of the condition code are decoded into four signals, and a mask operation with the signal E_BRANCH_MASK is applied to the individual signals. If an unmasked signal is true, an output signal of the comparator 176 becomes active. The output signal of the comparator 176 is input to one of the inputs of an AND gate 178. The signal E_CONDITION_BRANCH is input to the other input of the AND gate 178. Therefore, the output signal E_TKN indicates that the branch condition specified by a conditional branch instruction at the E stage has been satisfied.

Figure 11A:
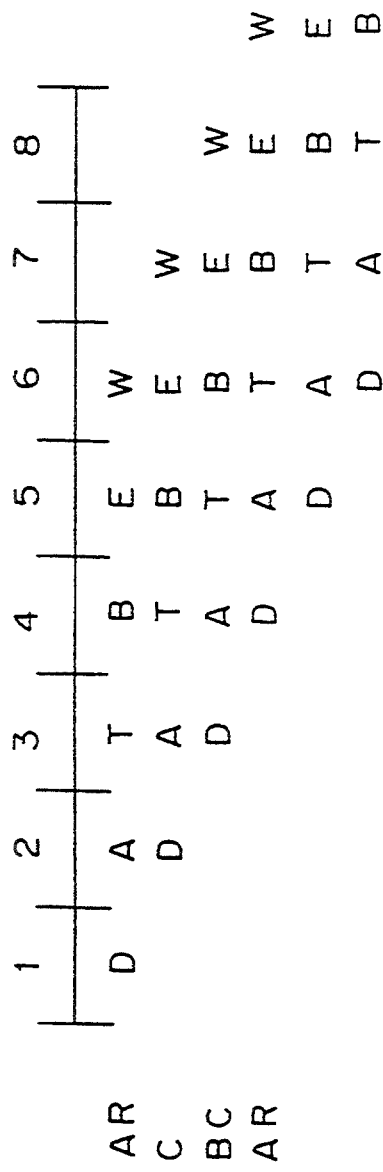
FIGS. 11A and 11B are timing charts for explaining operations of the circuit according to an embodiment of the present invention.
Figure 11B:
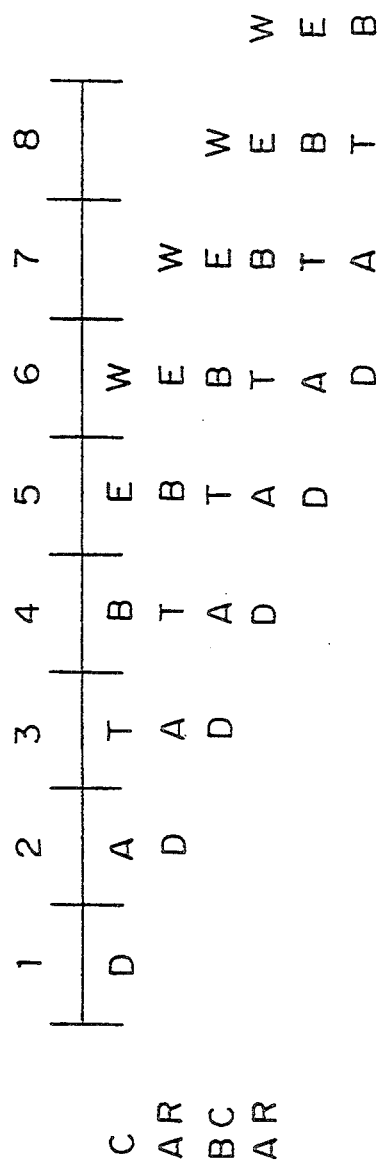

FIGS. 11A and 11B are timing charts for explaining operations of the above embodiment.

In FIG. 11A, an instruction stream constituted by four successive instructions AR, C, BC, and AR is fed into the pipeline. The AR (Add Register) instruction is for adding a register operand to the same or another register operand. As mentioned before, since the AR instruction settles the condition code at the T stage, the signal CC_SET_1 becomes active at a stage where the AR instruction exists. The C (Compare) instruction is for full-bit comparing a register operand with a memory operand. Since the C instruction settles the condition code at the W stage, the signal CC_SET_3 becomes active at a stage where the C instruction exists. Since BC (Branch if Carry) is a conditional branch instruction, the signal CONDITION_BRANCH becomes active at a stage where the BC instruction exists.

The instructions fed after feeding of the conditional branch instructions, e.g., the AR instruction after BC instruction in this example, is determined based on branch prediction performed before the condition codes for the conditional branch instructions are settled.

In the fourth execution cycle in FIG. 11A, the BC instruction proceeds to the A stage, and therefore the signal A_CONDITION_BRANCH becomes active in controller 100 of FIG. 7, but since the C instruction is at the T stage, T_CC_SET_2 is active, and therefore, both T_CC_SET_0 and T_CC_SET_1 are inactive. Therefore, the signal A_BR_CHECK cannot become active because none of output signals of the gates 114, 116, 118, and 120 are active. In the fifth and sixth instruction cycles, the signals T_BR_CHECK and B_BR_CHECK cannot become active because of an obstruction of inactive signals B_CC_SET_0, 1 in controller 102 of FIG. 8 and inactive signals E_CC_SET_0, 1, 2 in controller 104 of FIG. 9, respectively. In the seventh instruction cycle, the BC instruction and the CC instruction proceed to the the E stage and W stage, respectively, and therefore $\overline{\text{W\_CC\_SET\_0}}$ becomes active in controller 106 of FIG. 10. Accordingly, E_BR_CHECK becomes active and the condition code supplied from the register 52 through the line 74 is selected in the selector 174. If a status of the condition code unmasked with the E_BRANCH_MASK in a comparator 176 is true, the signal E_TKN becomes active and the instructions following the BC instruction are canceled with intermediate results thereof in the pipeline, if the instructions which have been fed into the pipeline according to the branch prediction, are those executed when the branch condition is not satisfied. If the instructions which have been fed into the pipeline are those executed when the branch condition is satisfied, the feeding of instruction stream is continued.

In FIG. 11B, an instruction stream constituted by four successive instructions C, AR, BC, and AR is fed into the pipeline. In this example, the condition codes for the BC instruction is settled in fourth cycle by the AR instruction proceeding to the T stage. Therefore, when the BC instruction proceeds to the A stage in the fourth cycle, the A_BR_CHECK becomes active and the condition code stored in the register 48 is selected in selector 128 because the signal T_CC_SET_1 is active in controller 100 of FIG. 7.

It is claimed:

1. A circuit for executing conditional branch instructions from an instruction register in a pipeline processor having a plurality of cascaded pipeline stages having components performing pipeline operations, the pipeline stages including condition code setting stages having components where condition codes are set and execution stages having components where the conditional branch instructions can be executed, condition codes being set by condition code setting instructions in the condition code setting stages, the conditional branch instructions being executed in dependence upon the condition codes, said circuit comprising:
    plural first storage means, operatively connected to the condition code setting stages, for separately storing condition codes set at each of the condition code setting stages;
    plural sequential second storage means, operatively connected to the execution stages, for storing first data identifying the conditional branch instructions at respective pipeline stages and second data indicating condition code setting stages where the condition codes are set by the condition code setting instruction in the respective pipeline stages; and
    control means, operatively connected to each of said plural first storage means and to each of said plural second storage means, for detecting setting of the condition codes to be used in the conditional branch instructions in the respective execution stages by using the second data, and for indicating that and the execution stage at which a branch is to occur responsive the condition codes stored in said first storage means, in accordance with the first data and second data stored in said second storage means.

2. A circuit as claimed in claim 1,
    wherein each of said plural first storage means comprises a first register respectively storing the condition codes set in the respective condition code setting stages,
    wherein each of said plural second storage means comprises a second register storing the first data for the respective pipeline stages and respective execution stages, and a third register storing the second data for the respective pipeline stages, and
    wherein said control means includes a plurality of controllers provided for each of the execution stages, said controllers operatively connected to at least two of said first registers, to the second registers storing the first data for the respective execution stages, and to the third registers storing the second data for pipeline stages following the respective execution stages, for performing the detection and indication with respect to the respective execution stages.

3. A circuit as claimed in claim 2, wherein each of said controllers includes:
    a gate circuit inputting the second data stored in the third registers operatively connected to the respective controllers and outputting a first signal indicating setting of the condition code and a second signal indicating the condition code setting stage where the condition code is set, and
    a selector circuit inputting the condition codes stored in the first registers operatively connected to the respective controllers and the second signal, and outputting a condition code selected according to the second signal.

4. A circuit as claimed in claim 1,
    further comprising a plurality of general registers for data storage,
    wherein the pipeline stages include:
        a decode stage, including said general registers, and for instruction decoding and reading contents of said general registers,
        an address stage connected to said general registers and for calculating a logical address from the contents of said general registers,
        a translation stage for translating the logical address into a real address,
        a buffer stage for reading a memory operand,
        an execution stage for executing operations of instructions, and
        a write stage for writing execution results in write registers,
    wherein said condition code setting stages include said translation stage, said execution stage and said write stage, and
    wherein said execution stages include said address stage, said translation stage, said buffer stage, and said execution stage.

5. A pipeline processor, comprising:
    an instruction execution pipeline connected to an instruction register and having cascaded decode, address translate, buffer, execute and write stages each stage comprising circuit means, condition codes being set at the translate, buffer, execute and write stages by condition code setting instructions located in the stages;

condition code registers connected to corresponding condition code setting stages of the execution pipeline and storing the set condition codes;

a condition code determination indication pipeline having sequential decode, address translate, buffer, execute and write stage indication registers, each indication register containing a tag indicating whether the condition code setting instruction in the corresponding stages in said execution pipeline sets the condition code at that stage and indicating whether a conditional branch instruction exists in that stage; and a branch controller connected to each of said condition code registers and each of said indication registers and indicating a branch is to occur responsive to contents of said condition code and indication registers.

* * * * *

UNITED STATES PATENT AND TRADEMARK OFFICE
CERTIFICATE OF CORRECTION

PATENT NO. : 5,408,620        Page 1 of 2
DATED : April 18, 1995
INVENTOR(S) : Asakawa et al.

It is certified that error appears in the above-indentified patent and that said Letters Patent is hereby corrected as shown below:

```
    Column 2, line 60, after "," insert --and--- and
         delete "and" after "plurality".
    Column 3, line 54, change "(Index Register)" to
         --(indeX Register)--.
    Column 4, line 18, "thee" should be --the E--.
       Column 4, line 30, insert --the-- after "through"
         (second occurrence).
    Column 5, line 30, delete "CC-Set".
    Column 5, line 31, insert --CC-Set-- after "the".
    Column 5, line 64, insert --the-- after "at" (second
         occurrence).
       Column 6, line 23, after "at" insert --the--.
    Column 6, line 26, change "E_CC_SET_" to --E_CC_SET_O--
    Column 7, line 28, insert --the-- after "at" (second
         occurrence).
    Column 7, line 59, change "W_CC_SET_O" to
         --W_CC_Set_O--.
    Column 7, line 61, change "W_CC_SET_O" to
         --W_CC_Set_O--.
```

UNITED STATES PATENT AND TRADEMARK OFFICE
CERTIFICATE OF CORRECTION

PATENT NO. : 5,408,620  Page 2 of 2
DATED      : April 18, 1995
INVENTOR(S): Asakawa et al.

It is certified that error appears in the above-indentified patent and that said Letters Patent is hereby corrected as shown below:

```
Column 8, line 67, change "beech" to --been--.
Column 9, lines 2 and 3, change "W_CC_SET_O" to
      --W_CC_Set _O--.
Column 9, line 64, insert --is-- after "W_CC_SET_O".
```

Signed and Sealed this

Fourteenth Day of November, 1995

Attest:

BRUCE LEHMAN

*Attesting Officer*  *Commissioner of Patents and Trademarks*